(No Model.)
M. C. RICE.
MERIDIAN DETERMINING DEVICE OR ATTACHMENT FOR SURVEYORS' COMPASSES, &c.
No. 552,002.
Patented Dec. 24, 1895.
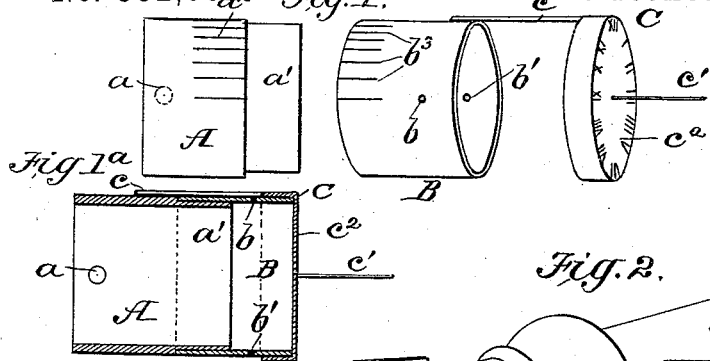
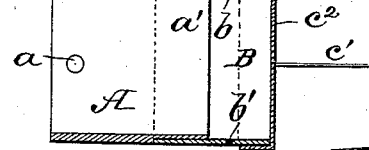
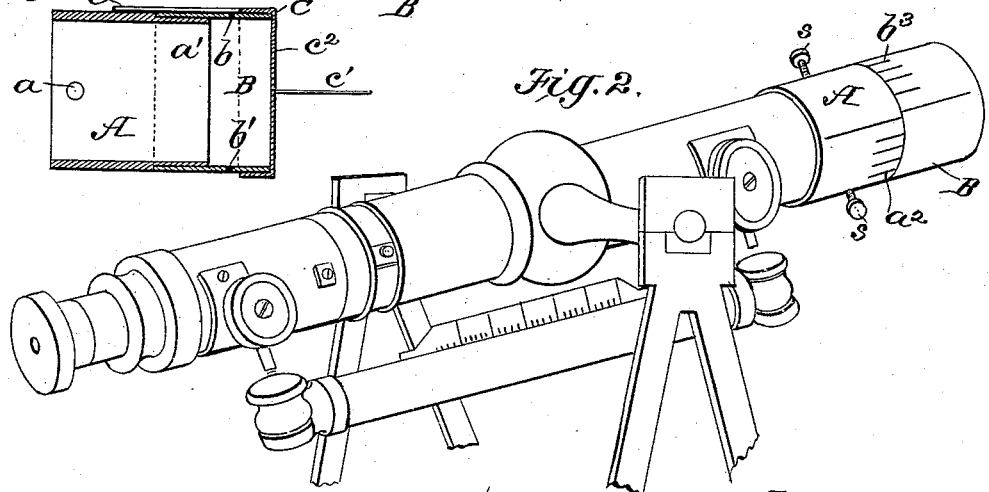
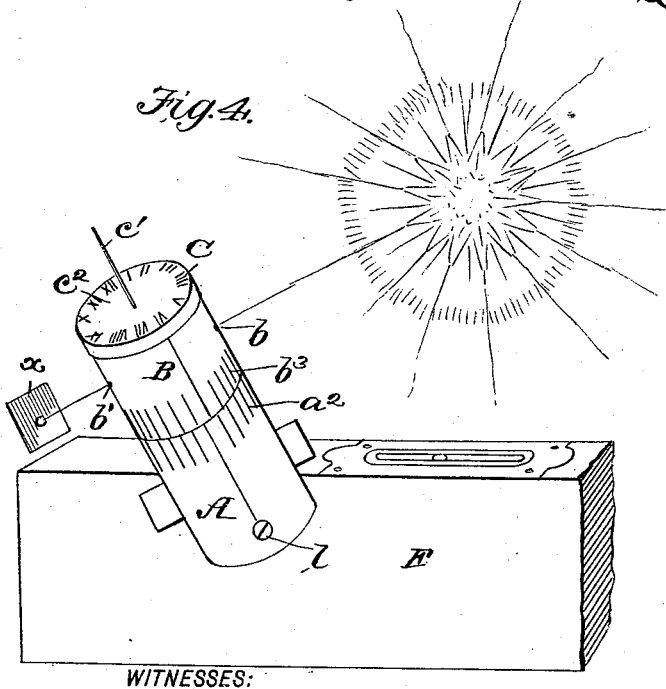
WITNESSES:
Jos. A. Ryan
Edw. W. Byrn
INVENTOR
Martin C. Rice.
BY Munn & Co.
ATTORNEYS.

UNITED STATES PATENT OFFICE.

MARTIN C. RICE, OF LAWRENCE, KANSAS.

MERIDIAN-DETERMINING DEVICE OR ATTACHMENT FOR SURVEYORS' COMPASSES, &c.

SPECIFICATION forming part of Letters Patent No. 552,002, dated December 24, 1895.

Application filed January 21, 1895. Serial No. 535,736. (No model.)

*To all whom it may concern:*

Be it known that I, MARTIN C. RICE, of Lawrence, in the county of Douglas and State of Kansas, have invented a new and useful Improvement in Meridian-Determining Devices for Engineers' Transits, Surveyors' Compasses, &c., of which the following is a specification.

The object of my invention is to provide a simple and practical attachment to an engineer's or architect's transit, surveyor's compass, carpenter's level, or other similar instrument, for determining the variations of the needle and fixing the true meridian, and which by a special application of a sun-dial may also be conveniently used for determining the correct time of day at any desired point; and it consists mainly in the peculiar construction and arrangement of a sectional tube, as will be hereinafter more fully described with reference to the drawings, in which—

Figure 1 is a view of the detached parts of said tube. Fig. 1$^a$ is a longitudinal section of the same as assembled or connected for use. Fig. 2 is a perspective view of the tube applied to an engineer's transit. Fig. 3 is a perspective view of the tube applied to one of the sight-vanes of the surveyor's compass or the alidade of the plane-table, and Fig. 4 is a perspective view of the tube applied to the carpenter's level, showing the use of the sun-dial attachment.

Referring to Figs. 1 and 1$^a$, A and B represent the tube. A is the hour part of the tube with a scale $a^2$ of twelve hour-spaces on half of its circumference, with the long meridian-mark in the center, six hour-spaces on each side, from six a. m. on one side to twelve m. in the middle and on to six p. m. on the other side. The upper end of the hour-tube is reduced or turned down at $a'$ one-half inch and the part B styled the "vernier" is slipped onto it. The part B has a vernier-scale $b^3$ reading from the center in the half-circumference each way to five minutes. Part B is one and a half inches long, and one-half inch from the top are two diametrically-opposite pin-holes $b$ and $b'$ aligned through the center of the tube and at right angles to the tube, with vernier on the upper side. The tube combined is four inches long and is mounted by a screw-clamp $l$, Fig. 3, passing through a hole $a$ which forms an axis at right angles to the line of sight, allowing the tube to swing in a vertical plane parallel to the plane of the line of sight.

As an attachment to the transit, as shown in Fig. 2, the tube is made large enough to slip onto the object end of the telescope and swings vertically with it, and is adjusted to the line of sights with set-screws $s\ s$. The two pin-holes $b\ b'$ take the place of a cross-telescope in astronomical meridianals or equatorials. Attached as described to the sight-vane of the compass or alidade, or to the telescope of the transit, it is ready for use as follows: Level up the instrument, bring the tube to a vertical position, direct one of the pin-holes toward the sun, and a ray or beam of sunlight will pass through it and show on the inside of the tube on the opposite side. Turn the instrument on the spindle and incline the tube north or from the sun till the ray of sunlight is brought through the opposite pin-hole and shows on a card held up to catch it, as at $x$, Fig. 4. Clamp the instrument to the spindle and its line of sights will be in the meridian, and the variation of the needle can be read off on the compass and plane-table.

Whenever the sun's ray passes through the two pin-holes the vernier will indicate the hour-angle from the meridian, and the local time can be read off on the hour-spaces.

C is a dial-cap having the hours marked on its face and provided with a long pointer $c$ and a central pin $c'$ forming a polar axis. After the tube is brought into the meridian the dial-cap is slipped onto the top, as in Fig. 1$^a$, and is adjusted by bringing the pointer to the meridian-mark on the hour part A of the tube, and then leaned up a little to the south, and the shadow of the polar axis $c'$ will indicate the hour on the dial-plate and go on keeping time as long as the instrument is left standing. This is easily applied to a carpenter's level, as in Fig. 4, and will enable the intelligent mechanic to note the correct time without a watch whenever desired.

As with all solars the sun should not be taken till well up, and south of an east and west line, at the place of observation.

The principle of this tube may be briefly stated as follows, and embraces a well-understood astronomical proposition: In an exoteric view the sun may be said to pass around the earth in the zodiac, as still represented in all the almanacs, and in its daily journey it seems so, and all meridinal problems are correctly solved on this fiction. The polar axis of the plane of the sun's apparent orbit in this latitude always leans over north and is in the same vertical plane with the polar axis of the earth, and as the sun travels north it leans over still more, and rises up as the sun goes south, but it does not vary its position east and west. This is the result of the earth's motion. The refraction need not be taken into account unless tables are used, as it apparently only increases the altitude of the sun. A ray or beam of light from the sun passes along this plane and strikes the polar axis of the plane of the sun's apparent path at right angles. I form with my device and the instrument what is styled a "projection" of this plane, and allow the tube to represent the imaginary polar axis of this plane of the sun's path, and when this beam of sunlight that slides along this passes through the two pinholes in the solar tube it establishes the fact that the tube corresponds in relative position with the polar axis of the plane of the sun's apparent orbit, and as this is in the same vertical plane of the polar axis of the earth, and the tube is the line of sight of the instrument, we have of course the exact meridian.

Having thus described my invention, what I claim as new, and desire to secure by Letters Patent, is—

1. A meridianal attachment to an engineer's transit, surveyor's compass, plane table, or level, consisting of a sectional tube having two parts rotatable in relation to each other about a common longitudinal axis, one of said parts being mounted on an axis at right angles to the longitudinal axis and having twelve hour subdivisions, and the other part being provided with diametrically opposite pin holes and a vernier scale substantially as and for the purpose described.

2. The meridianal attachment herein described, consisting of a sectional tube having two parts rotatable in relation to each other about a common longitudinal axis, one of said parts being mounted on an axis at right angles to the longitudinal axis and having twelve hour subdivisions, and the other part being provided with diametrically opposite pin holes and a vernier scale; in combination with a dial cap having a central pin or polar axis with a concentric ring of hour indications thereabout said cap being applied to the vernier section of the tube and provided with a long pointer extended over to the hour subdivisions of the hour tube substantially as and for the purpose described.

Signed at Lawrence, in the county of Douglas, in the State of Kansas, this 2d day of January, 1895.

MARTIN C. RICE.

In presence of—
  M. E. RICE,
  M. A. RICE.